(No Model.)

J. F. FOWLER.
POTATO DIGGER.

No. 450,008. Patented Apr. 7, 1891.

WITNESSES:

INVENTOR:
J. F. Fowler

ATTORNEYS.

UNITED STATES PATENT OFFICE.

JOHN FRANKLYN FOWLER, OF BROOKLYN, NEW YORK.

POTATO-DIGGER.

SPECIFICATION forming part of Letters Patent No. 450,008, dated April 7, 1891.

Application filed September 9, 1889. Serial No. 323,444. (No model.)

*To all whom it may concern:*

Be it known that I, JOHN FRANKLYN FOWLER, of Brooklyn, in the county of Kings and State of New York, have invented a new and Improved Potato-Digger, of which the following is a full, clear, and exact description.

The invention consists of the construction, arrangement, and combination of parts, all as hereinafter described and claimed.

Reference is to be had to the accompanying drawings, forming a part of this specification, in which similar letters of reference indicate corresponding parts in all the figures.

Figure 1:
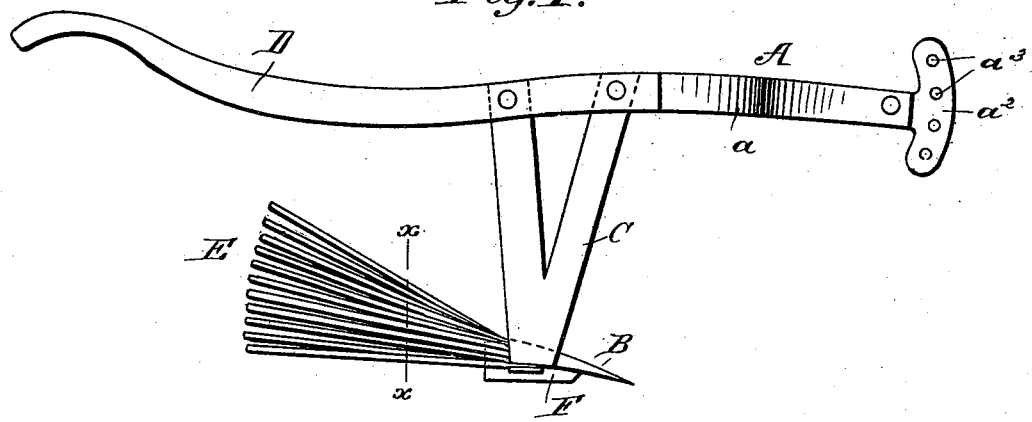
Figure 2:
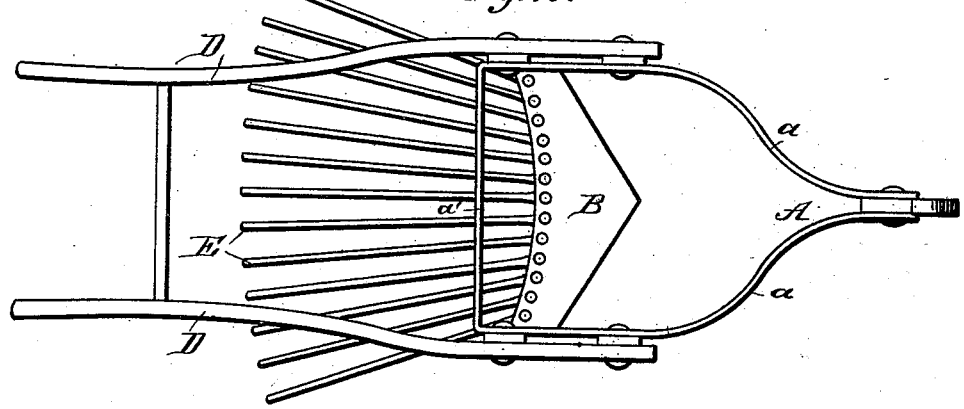
Figure 3:
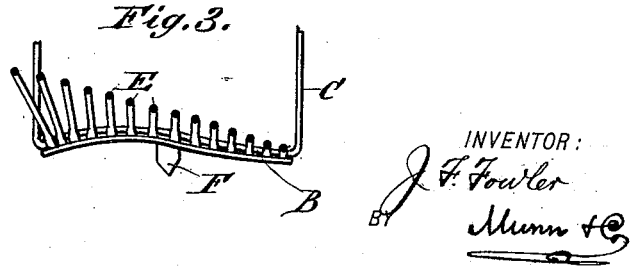

Figure 1 is a side elevation of my new and improved potato-digger. Fig. 2 is a plan view of the same, and Fig. 3 is a detailed sectional view on line $x\,x$ of Fig. 1.

A is the beam, formed of two outwardly-curved members $a\,a$, braced at the rear ends by the cross-piece $a'$. At the front the beam is formed or provided with the clevis $a^2$, formed with a series of holes $a^3$ to regulate the draft and penetration of the point B, attached to the side standards C C, attached to the beam. The handles D D are connected to the beam and standards, as shown clearly in Fig. 2. The point B reaches from standard to standard, and is pointed and upwardly curved, and has a downward slant or pitch from the line of the beam, as shown clearly in Fig. 1, so that in use the action will be not only to penetrate the ground, but to lift the soil and spread it to either side. At the rear edge of the point are secured the series of rods E E, which rise one above the other, as indicated in Figs. 1 and 3, so that these rods will not only separate the potatoes from the soil, but will shift them to one side and deposit them together in one row at the side of the row of hills being dug, said rods acting in a capacity equivalent to that of the mold-board of a plow. At the bottom of the point in the center is secured the foot-piece F, which penetrates the bottom of the furrow and guides and steadies the digger. By this construction the machine is made very cheap, and is efficient and easy to manage.

It will be seen that the fingers form practically a rearward continuation of the plow B, and also that they form practically an incline ranging transversely from one side of the plow to the other, the plow B itself lying practically in the horizontal plane, or approximately so, its upper surface being inclined downwardly and outwardly from about the center.

Having thus described my invention, what I claim as new, and desire to secure by Letters Patent, is—

1. The combination, with a plow having a downwardly and outwardly tapering form from each side of its center, of a series of fingers secured at the rear edge of said plow and projecting upwardly and rearwardly above the upper surface of the rear edge of said plow, the said fingers being of a gradually-increasing height from one side to the other of said plow, substantially as described.

2. The combination, with a plow having a downwardly and outwardly tapering form at each side of its center and provided with a shoe or foot piece at its under side, of a series of fingers secured at the rear edge of said plow and projecting upwardly and rearwardly above the upper surface of the rear edge of said plow, the said fingers being of a gradually-increasing height from one side to the other of the said plow, substantially as described.

3. A potato-digger comprising the following elements in combination, to wit: a beam, a U-shaped hanger carried by said beam, a plow or point held to the cross-bar of said U-shaped hanger, and a series of fingers secured at the rear edge of the said plow and forming a rearward continuation thereof, the said fingers projecting upwardly and rearwardly above said rear edge of the plow, and being of gradually-increasing height from one side of the plow to the other, substantially as described.

JOHN FRANKLYN FOWLER.

Witnesses:
 H. A. WEST,
 C. SEDGWICK.